(12) United States Patent
Yoshida et al.

(10) Patent No.: US 7,037,228 B2
(45) Date of Patent: *May 2, 2006

(54) CHAIN TENSION-IMPARTING DEVICE

(75) Inventors: Osamu Yoshida, Osaka (JP); Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 427 days.

This patent is subject to a terminal disclaimer.

(21) Appl. No.: 10/454,860

(22) Filed: Jun. 5, 2003

(65) Prior Publication Data
US 2004/0029666 A1    Feb. 12, 2004

(30) Foreign Application Priority Data
Aug. 12, 2002  (JP) .............................. 2002/234830

(51) Int. Cl.
 *F16H 7/08*    (2006.01)
 *F16H 7/22*    (2006.01)
(52) U.S. Cl. ...................................... 474/109; 474/110
(58) Field of Classification Search ................ 474/101, 474/138, 111–109, 113, 117, 140
See application file for complete search history.

(56) References Cited

U.S. PATENT DOCUMENTS

| | | | |
|---|---|---|---|
| 5,913,742 A * | 6/1999 | Nakamura et al. | 474/110 |
| 6,193,623 B1 * | 2/2001 | Koch et al. | 474/110 |
| 6,383,103 B1 * | 5/2002 | Fujimoto et al. | 474/110 |
| 6,592,479 B1 * | 7/2003 | Nakakubo et al. | 474/109 |
| 6,767,302 B1 * | 7/2004 | Seungpyo | 474/109 |
| 6,808,466 B1 | 10/2004 | Yoshida et al. | |
| 6,852,049 B1 * | 2/2005 | Markley et al. | 474/109 |
| 6,866,601 B1 * | 3/2005 | Saitoh et al. | 474/109 |
| 2002/0025869 A1 | 2/2002 | Serkh | |
| 2003/0186764 A1 | 10/2003 | Yoshida | |
| 2004/0029664 A1 * | 2/2004 | Yoshida et al. | 474/109 |
| 2004/0029665 A1 | 2/2004 | Tsubakimoto | |
| 2004/0127316 A1 | 7/2004 | Tsubakimoto | |

FOREIGN PATENT DOCUMENTS

| | | | |
|---|---|---|---|
| EP | 0915268 A1 | | 5/1999 |
| EP | 1323948 A1 | * | 7/2003 |
| JP | 2002039295 A | | 2/2002 |
| WO | WO 00/32903 A1 | * | 6/2000 |

OTHER PUBLICATIONS

British Search Rep, filed. Nov. 28, 2003, entire document.
EPO Search Report, filed Nov. 28, 2003, entire document.

* cited by examiner

*Primary Examiner*—Marcus Charles
(74) *Attorney, Agent, or Firm*—Woodling, Krost and Rust

(57) ABSTRACT

A chain tension-imparting device 100 comprises: a plunger 120, which retractably protrudes toward a traveling chain; a housing body 110 in which a plunger sliding hole 111 was formed; a protrusion biasing spring 130, which biases the plunger 120; a cam-receiving ring 140, which is displaced in an opening front end side diameter-increased concave portion 111*a* in the plunger sliding hole 111; a cam-receiving ring biasing spring 150 for biasing said the cam-receiving ring 140 in the protrusive direction of the plunger 120; a pair of wedge-shaped cam chips 160, 160, which slide on a sloped cam guide groove 141 formed on the cam-receiving ring 140 and engage with a plurality of racks 121, 121 engraved on the outer circumference of the plunger 120; a cam-guiding ring 170, for guide-controlling disengagement of the wedge-shaped cam chips 160; and a seal plate 180, which seals the opening front end side diameter-increased concave portion 111*a*.

2 Claims, 8 Drawing Sheets

CHAIN TENSION-IMPARTING DEVICE

CROSS REFERENCE TO RELATED APPLICATION

This application claims the benefit of Japanese Patent Application 2002-234830 filed Aug. 12, 2002.

TECHNICAL FIELD TO WHICH THE INVENTION PERTAINS

The present invention relates to a chain tension-imparting device in use for imparting proper tension to a power transmitting chain trained in a vehicle engine, and the chain tension-imparting device is especially called as a chain tensioner in use for a timing chain, which transmits rotation between a crankshaft side sprocket and a camshaft side sprocket.

RELATED ART

A conventional chain tension-imparting device 500 shown in FIG. 10, which the present inventors developed, comprises a plunger 520, which retractably protrudes toward a traveling chain, a housing body 510 in which a plunger sliding hole 511 for retractably fitting the plunger 520, a biasing protruding spring 530, which biases the plunger 520 in a protrusive direction with respect to the housing body 510, wedge-shaped cam chips 540, loosely inserted into a cam guide groove 512 formed on the top end side of the plunger sliding hole 511, which engages with racks 521 respectively engraved at the opposed positions where the outer circumference of said the plunger 520 is divided to two parts, a cam biasing spring 550 loosely fitted to the plunger 520, which biases the wedge-shaped cam chips 540 so as to push it into the plunger sliding hole 511, and a seal plate 560 disposed at the top end side of the plunger sliding hole 511 while being in contact with the for supporting the cam biasing spring 550.

As a chain is elongated during engine operation, this chain tension-imparting device 500 controls an appropriate backstop distance (backrush distance) by sequential proceeding of the plunger 500 by one tooth so that it suppresses noise which is liable to occur in the chain and maintains appropriate chain tension.

Problems to be Solved by the Invention

However, in the conventional chain tension-imparting device 500, the backrush distance for exerting the above-mentioned backstop function reliably and appropriately is not particularly considered and there was a problem that wobbling sounds due to wobbling of the chain at the start of engine or the like and hew sounds during excess tensioning of the chain, which is generated by excess protrusion of the plunger, were generated. And such a problem can often arise due to the fact that the setting of the backrush distance is not matched to the individual engines. When the backrush distance is generally large, the wobbling sounds due to wobbling of the chain are liable to occur at the start of engine, and when the backrush distance is small, the plunger 520 protrudes excessively and hew sounds due to excess tensioning of the chain are likely to occur.

Further, the backrush distance is changed before and after the wedge-shaped cam chips 540 each step across one tooth of the rack 521 engraved in the plunger. When the backrush distance just before wedge-shaped cam chips 540 each stepped across one tooth of the rack 521 is set at a maximum backrush distance and the backrush distance just after wedge-shaped cam chips 540 each stepped across one tooth of the rack 521 is set at a minimum backrush distance, the balance between a maximum backrush distance and a minimum backrush distance has a large effect on the above-mentioned noise.

Therefore, adjusting the backrush distance by changing the design of tooth length of the rack of the plunger 520 was tried to solve these problems. However, there was a problem that wear in the wedge-shaped cam chip 540 and the rack 521 and chipping of a tooth due to poor strength of the tooth were generated.

And by remarkable restrictions such as tooth strength in designing the rack of the plunger 520 and the wedge-shaped cam chip 540 and the like, an adjustable backrush distance is limited to an extremely narrow range and cannot be applied to various engines. As a result there were problems that the wobbling sounds of the chain and whistling sound due to excess protrusion of the plunger 520 occur as mentioned above.

Further, since the conventional chain tension-imparting device 500 biases the wedge-shaped cam chips 540 so as to push it into the plunger sliding hole 511 so that protrusion of the wedge-shaped cam chips 540 to a plunger protruding direction is limited. Therefore, the cam biasing spring 550 must be disposed at a further front end than the wedge-shaped cam chips 540. Therefore, there were problems that to make the tensioner body compact is not desired and a tensioner cannot be applied to a narrow space on the engine layout.

Further, when the chain tension is adjusted the cam biasing spring 550 is elastically deformed in a spiral form. Accordingly, the respective wedge-shaped cam chips 540, 540, which are in contact with the cam side end surface of the cam biasing spring 550 at their corresponding positions, cannot step across the rack 521 of the plunger simultaneously by one tooth and a state in which a load due to chain tension is received by only one wedge-shaped cam chip 540 is formed. As a result there was a problem that such a state affects on the endurance of the wedge-shaped cam chip 540.

Accordingly, the objects of the present invention are to solve the above-mentioned prior art problems and to provide a chain tension-imparting device, which can prevent wobbling noise of a chain at the start of engine and whistling sounds due to excess tensioning of the chain at excess protrusion of a plunger to maintain appropriate chain tension, and which can set a backrush distance required of various engines freely and in a wide range and has a simple assembling structure and excellent endurance.

Means for Solving the Problems

The above-mentioned problems are solved by a chain tension-imparting device characterized by comprising: a plunger, which retractably protrudes toward a traveling chain; a housing body in which a plunger sliding hole into which the plunger is retractably fit-inserted was formed; a protrusion biasing spring, which biases the plunger in a protrusive direction with respect to the housing body; a cam-receiving ring, fitted on the plunger from the outside in a diameter-increased concave portion of the plunger sliding hole on its opening front end side and which is displaced in the axial direction of the plunger; a cam-receiving ring biasing spring for biasing the cam-receiving ring in the protrusive direction of the plunger; a plurality of wedge-shaped cam chips, which slide on a sloped cam guide groove formed on the cam-receiving ring and engage with a plurality of racks engraved on the outer circumference of the plunger respectively; a cam-guiding ring, fitted on the plunger from the outside in a diameter-increased concave portion of the plunger sliding hole at its opening front end for guide controlling disengagement of the plurality of wedge-shaped cam chips; and a seal plate, which retractably fit-inserts the plunger and movably seals the cam-receiving ring biasing spring, the cam-receiving ring, the wedge-shaped cam chips and the cam-guiding ring sequentially disposed in a diameter-increased concave portion of the plunger sliding hole on its opening front end side, wherein when the cam-guiding ring is brought into contact with the back of the seal plate in the diameter-increased concave portion of the plunger sliding hole on its opening front end side, the cam-guiding ring guide-controls the disengagement of the wedge-shaped cam chips.

The above-mentioned problems are further solved by a chain tension-imparting device characterized in that when a minimum backrush distance of the plunger is defined as X, a maximum backrush distance thereof is defined as Y, a maximum displacement width of the cam-receiving ring is defined as S and a pitch of the rack is defined as P, an arrangement form of the plunger, the housing body, the cam-receiving ring biasing spring, the cam-receiving ring, said wedge-shaped cam chips and said cam-guiding ring is defined so as to satisfy X=S and Y=P+S.

The term "a maximum backrush distance Y" in the present invention means a return distance of a plunger from the immediately preceding position where the wedge-shaped cam chips each step one tooth to a backstop state, and the term "a minimum backrush distance X" means a return distance of a plunger from moment when the wedge-shaped cam chips each stepped one tooth.

The shapes of the sloped cam guide groove in the chain tension-imparting device of the present invention may take any shape if the wedge-shaped cam chips ascend or descend on the sloped cam guide groove in accordance with the extendable or retractable motion of the plunger so that they can smoothly slide on the sloped cam guide groove. However, if an angle (theta) of slope of the sloped cam guide groove with respect to the protrusive direction of the plunger is defined as Greek letter theta, it is more preferable that the shape of the sloped cam guide groove is set between 15°<theta<70°. When the angle (theta) of slope of the sloped cam guide groove is smaller than 15°, it becomes easy to make contact between the tooth head of the cam chip and the tooth head of the rack and chipping of tooth or excess rocking is liable to occur, and when the angle of slope (theta) of the sloped cam guide groove is larger than 70°, the movement of cam chips becomes slow and a wedge action on the plunger cannot be sufficiently exerted.

It is noted that the chain tension-imparting device of the present invention may adopt any type of a chain tension-imparting device that is attached to the inside of an engine in a sealed manner called as inner mounting type one and a chain tension-imparting device that is inserted from the outside of an engine called as an outer mounting type one.

The protrusion biasing spring in the chain tension-imparting device of the present invention may be interposed at any position between the front end portion of the plunger and the seal plate or between the rear end portion of the plunger and the bottom portion of the plunger sliding hole, if the plunger can be biased in a protrusive direction with respect to the housing body.

Further, the chain tension-imparting device of the present invention was described by use of a timing chain wrapped between a crankshaft side sprocket and a camshaft side sprocket of an engine as an object. However, the chain tension-imparting device of the present invention can be applied to a chain wrapped on not only to such a timing system but also to a balancer system or an oil pump system or the like. Furthermore, it is needless to say that the chain tension-imparting device of the present invention can be also applied to a belt.

Action

According to the chain tension-imparting device of the present invention, as a chain is elongated during engine operation, an appropriate backstop distance (backrush distance) is controlled by sequential proceeding of the plunger by one tooth so that foreign sounds are prevented and whistling sounds, which are generated during excess tensioning of the chain, are prevented. As a result appropriate chain tension is maintained.

The action of the present invention will be described in more detail below. That is, the chain tension-imparting device according to the present invention includes a plunger, which protrudes toward a traveling chain; a housing body in which a plunger sliding hole into which the plunger is retractably fit-inserted was formed; a protrusion biasing spring, which biases the plunger in a protrusive direction with respect to the housing body. Thus, when the traveling chain is loosened, the plunger biased in a protrusive direction by the protrusion biasing spring is moved forward rapidly.

When the plunger charges forward from a backstop state, a cam-receiving ring in the opening front end side diameter-increased concave portion is also displaced in the protrusive direction of the plunger by a biasing force of a cam-receiving ring biasing spring. As the this cam-receiving ring is displaced, a plurality of wedge-shaped cam chips and a cam-guiding ring are displaced in the protrusive direction of the plunger toward the back of a seal plate in the opening front end side diameter-increased concave portion.

Then, when the cam-guiding ring abuts on the back of the seal plate in the opening front end side diameter-increased concave portion to stop there, the wedge-shaped cam chips are slid on the sloped cam-guiding groove for the cam-receiving ring to ascend toward the outer circumference side until the engagement between the wedge-shaped cam chips and the rack of the plunger is released while pushing the cam-receiving ring back in the opposite direction to the protrusive direction of the plunger.

Since the cam-guiding ring is in contact with the back of the seal plate in the opening front end side diameter-increased concave portion to stop there, at the moment when the engagement between the wedge-shaped cam chips and the racks of the plunger is released, the wedge-shaped cam chips are slid on the sloped cam-guiding grooves in the cam-receiving ring in the opposite direction to descend toward the central axis of the plunger until they engage with the racks of the plunger at positions shifted by one tooth in each of the racks. As a result by its reaction the cam-receiving ring is relatively displaced again in the protrusive direction of the plunger.

When external force to push the plunger back is applied to the chain tension-imparting device of the present invention from the chain side in such a state, the wedge-shaped cam chips, which stepped over the rack of the plunger by one tooth, can exert a wedge action on the plunger as in a case before stepping over the rack of the plunger by only one tooth. Thus, the wedge-shaped cam chips can exert a backstop function to block the retractive displacement of the plunger.

The chain tension-imparting device of the present invention includes a pair of wedge-shaped cam chips, which engage with a plurality of racks engraved at the opposed positions where the outer circumference of the plunger is divided into at least two parts. Then, when the backstop function to block the retractive displacement of the plunger is acted, force which is pushed back through the plunger, is dispersedly uniformly imparted to on the wedge-shaped cam chips each disposed at the opposed positions, which divide the outer circumference into two parts.

The invention will be better understood when reference is made to the BRIEF DESCRIPTION OF THE DRAWINGS, DETAILED DESCRIPTION OF THE INVENTION and CLAIMS which follow hereinbelow.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

Preferable embodiments of a chain tension-imparting device according to the present invention will now be described with reference to drawings.

Figure 1:
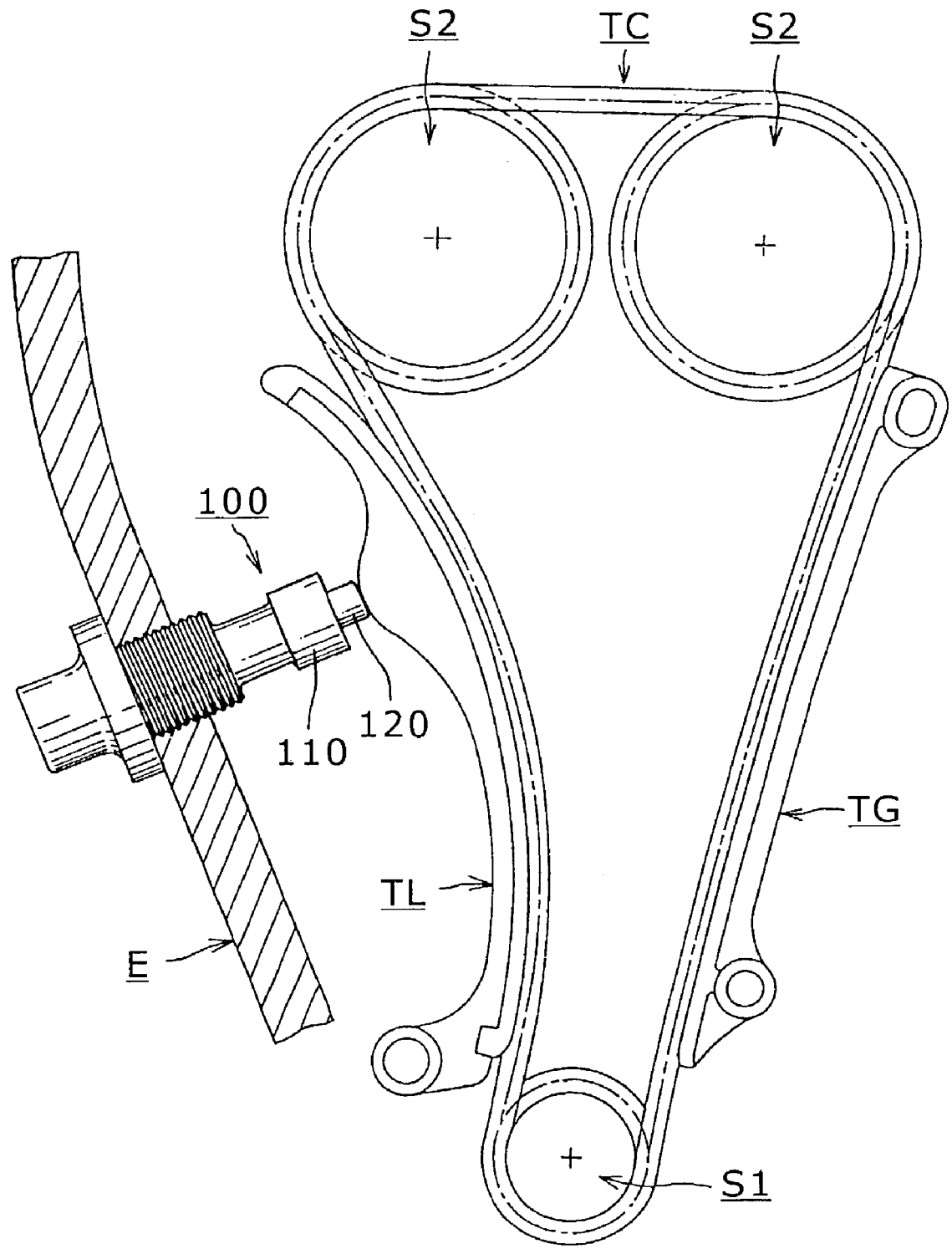
FIG. 1 is an arrangement view of a chain tension-imparting device, which is the first example according to the present invention.
Figure 5:
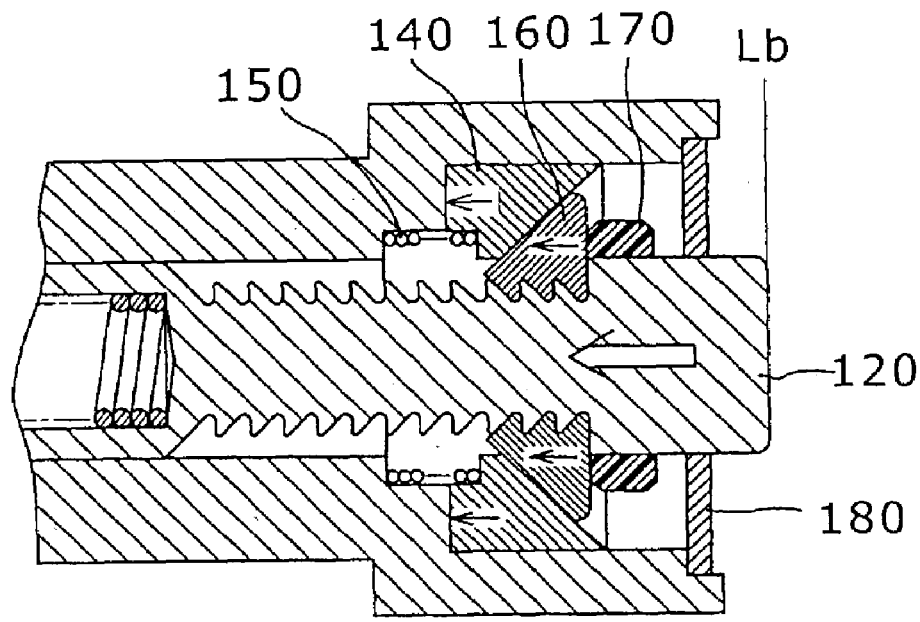
FIG. 5 is a view showing a state where a backstop function of the plunger has operated.
Figure 6:
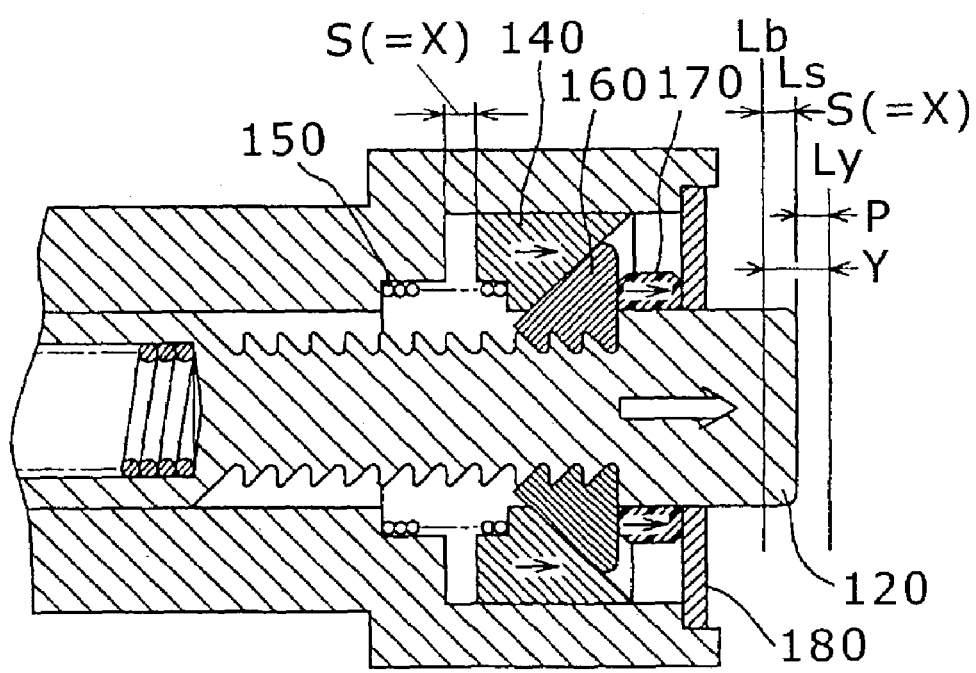
FIG. 6 is a view showing operating conditions of a tension-imparting function of the plunger until wedge-shaped cam chips starts disengagement from the rack of the plunger.
Figure 7:
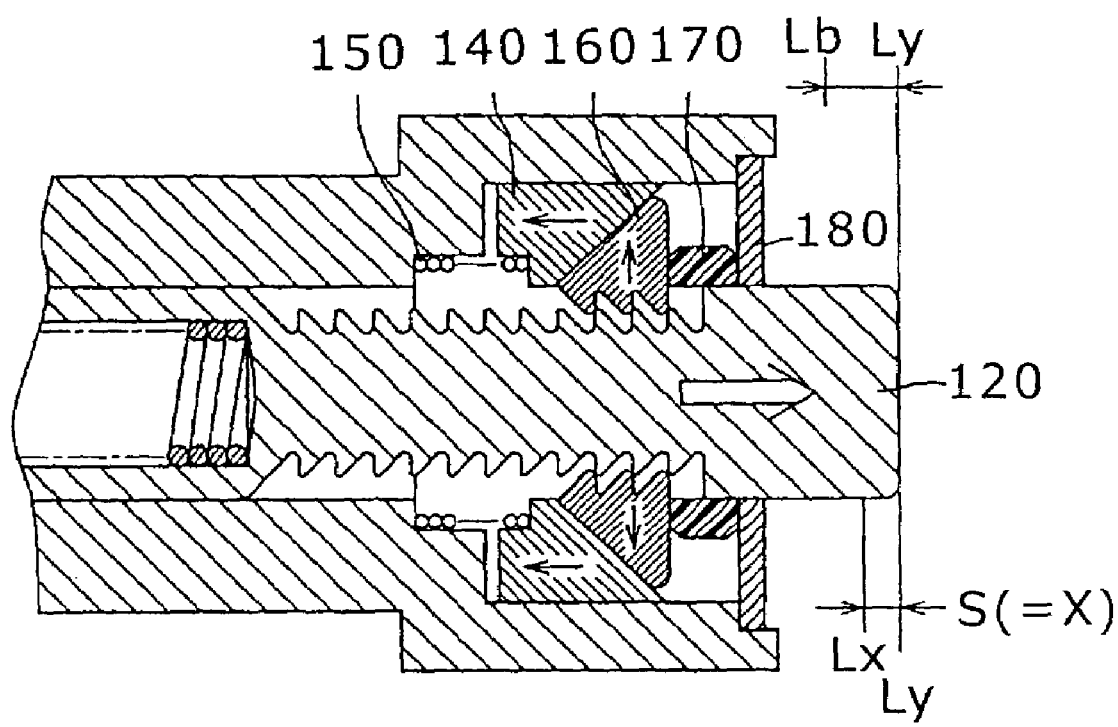
FIG. 7 is a view showing a state just before the wedge-shaped cam chips steps over the rack of the plunger by one tooth.
Figure 8:
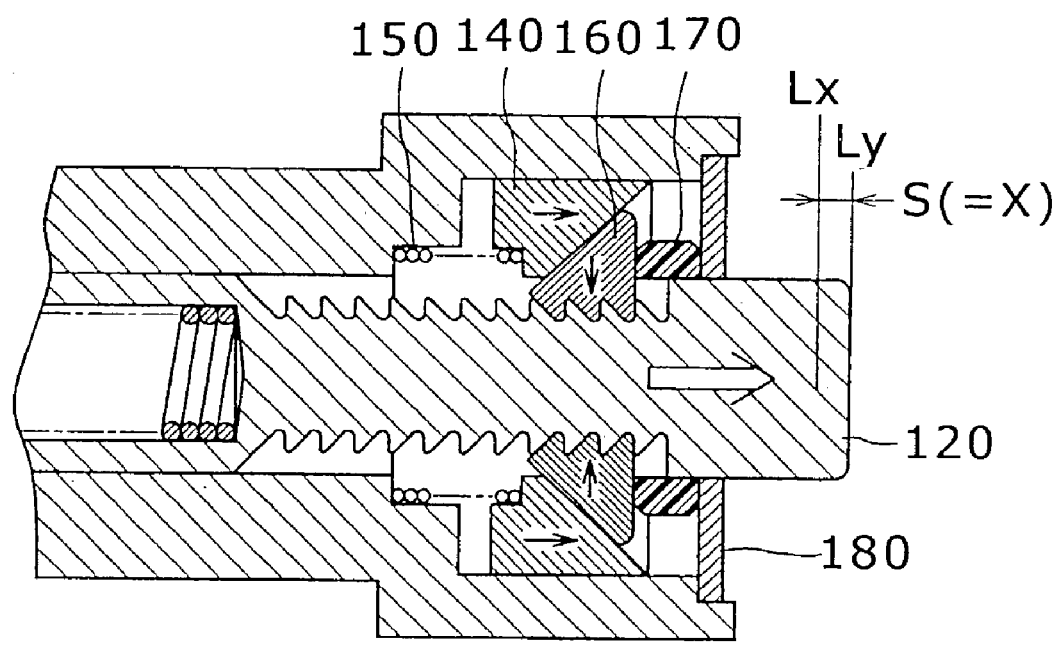
FIG. 8 is a view showing operating conditions of a tension-imparting function of the plunger just after the plunger has stepped over the rack of the plunger by one tooth.
Figure 9:
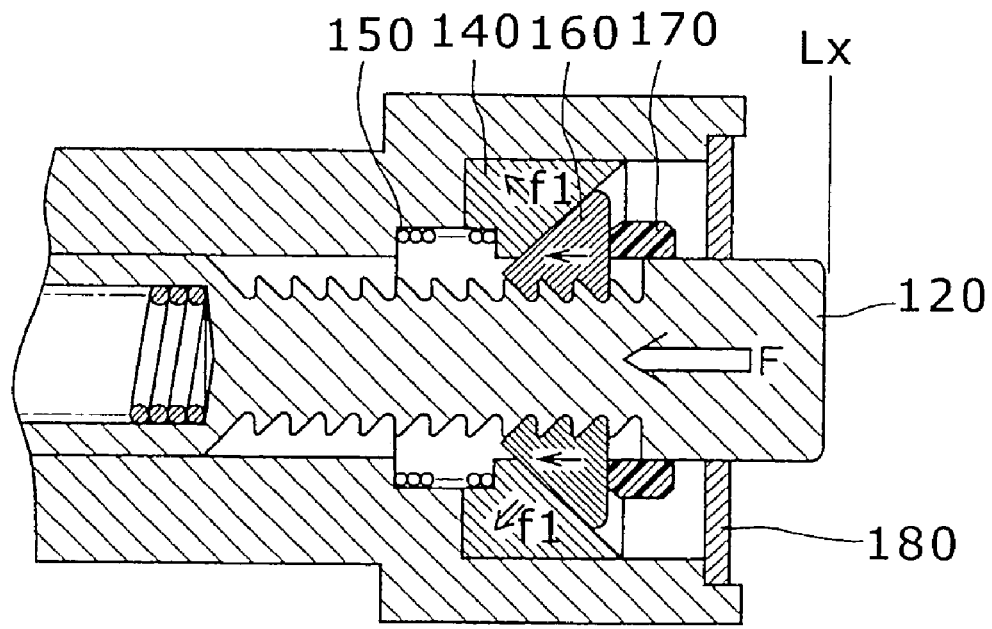
FIG. 9 is a view showing a state where the plunger stepped over the rack of the plunger by one tooth and a backstop function has operated

First, a chain tension-imparting device, which is a first Example of the present invention, will be described. FIG. 1 is an arrangement view of a chain tension-imparting device, which is the first example according to the present invention, FIG. 2 is a part-cutaway schematic view of the chain tension-imparting device shown in FIG. 1, FIG. 3 is an exploded view and its assembly view of the chain tension-imparting device shown in FIG. 1, FIG. 4 is a cross-sectional view of an enlarged principal portion of the chain tension-imparting device shown in FIG. 2, FIGS. 5 to 9 are views showing the operating states of the chain tension-imparting device shown in FIG. 1, Particularly, FIG. 5 is a view showing a state where a backstop function of the plunger has operated, FIG. 6 is a view showing operating conditions of a tension-imparting function of the plunger until wedge-shaped cam chips starts disengagement from the rack of the plunger, FIG. 7 is a view showing a state just before the wedge-shaped cam chips steps over the rack of the plunger by one tooth, FIG. 8 is a view showing operating conditions of a tension-imparting function of the plunger just after the plunger has stepped over the rack of the plunger by one tooth, and FIG. 9 is a view showing a state where the plunger stepped over the rack of the plunger by one tooth and a backstop function has operated.

The chain tension-imparting device 100 in the first Example is used as an outer attachment type chain tension-imparting device, which is attached from the outside of an engine to suppress the vibration generated during the traveling of a timing chain TC trained between a crankshaft side sprocket S1 and camshaft side sprockets S2 of such a vehicle engine shown in FIG. 1 as well as to maintain proper tension. In the chain tension-imparting device 100, a spring-biased cylindrical plunger 120 so as to be protruded toward a traveling timing chain TC, which travels in front of a housing body 110 attached to an engine block wall E presses the back surface of a tensioner lever TL pivotally supported on the engine block wall E, whereby a shoe surface of the tensioner lever TL is brought into sliding contact with the loosening side of the timing chain TC to impart tension to the timing chain TC.

It is noted that the reference mark TG in FIG. 1 denotes a tensioner guide fixed to the engine block wall, which travel-guides the timing chain TC so that the timing chain TC is prevented from wobbling.

Figure 2:
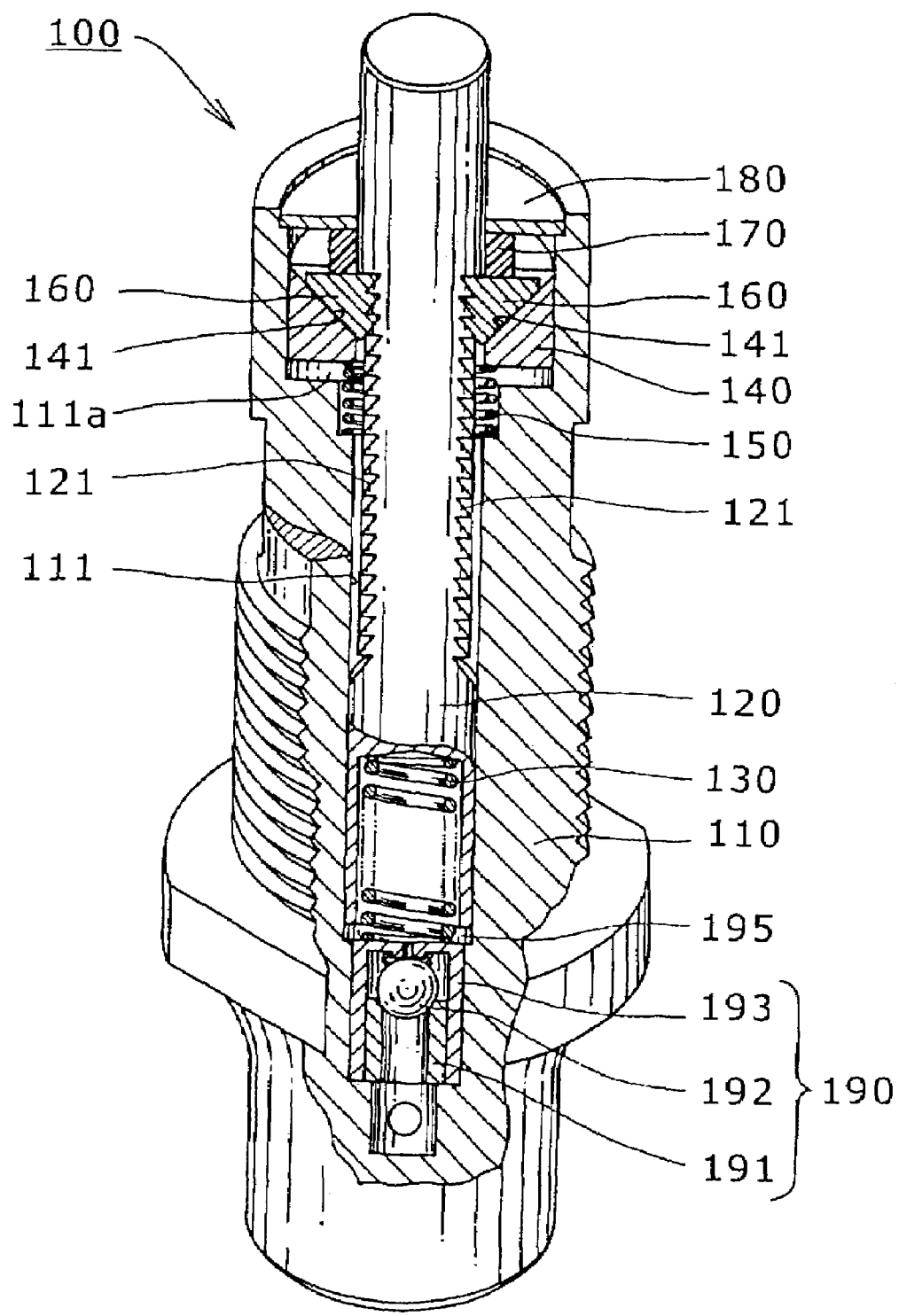
FIG. 2 is a part-cutaway schematic view of the chain tension-imparting device shown in FIG. 1.
Figure 3:
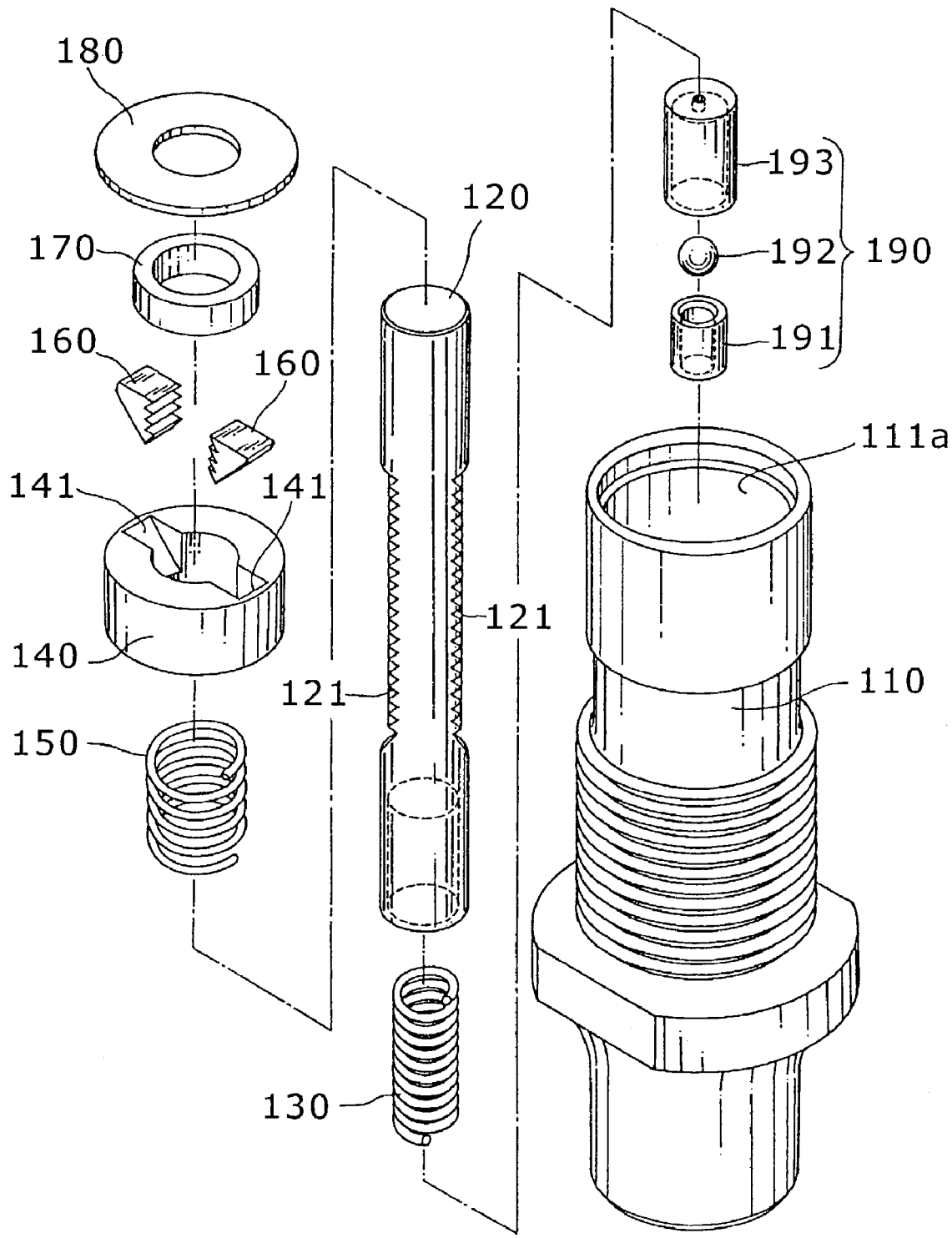
FIG. 3 is an exploded view and its assembly view of the chain tension-imparting device shown in FIG. 1.
Figure 4:
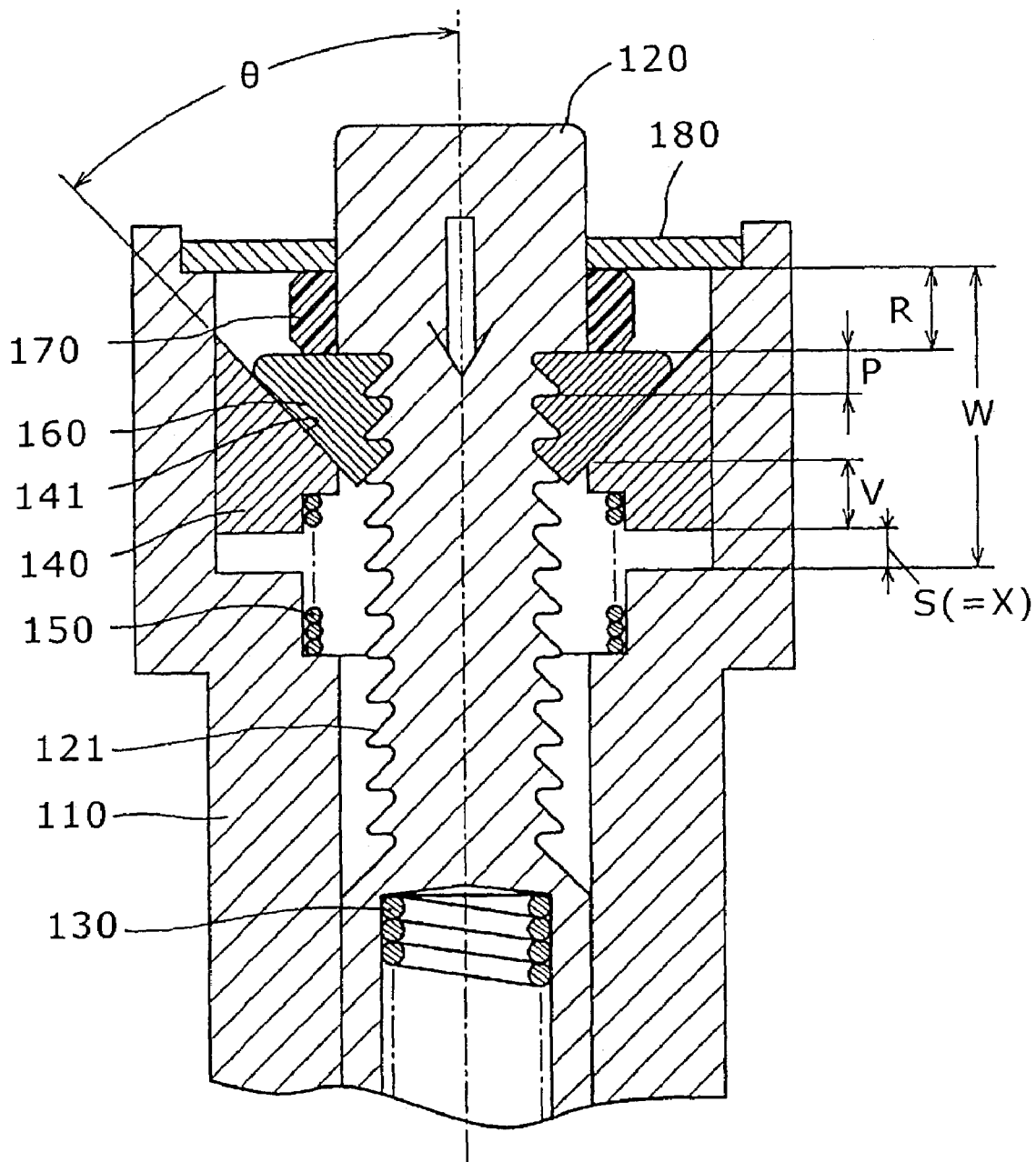
FIG. 4 is a cross-sectional view of an enlarged principal portion of the chain tension-imparting device shown in FIG. 2.

The chain tension-imparting device 100 of the present example comprises, as shown in FIGS. 2 to 4, a plunger 120, which retractably protrudes toward a traveling timing chain TC; a housing body 110 in which a plunger sliding hole 111 into which the plunger 120 is retractably fit-inserted was formed; a protrusion biasing spring 130, which biases the plunger 120 in a protrusive direction with respect to the housing body 110; a cam-receiving ring 140, fitted on the plunger 120 from the outside in a diameter-increased concave portion 111a of the plunger sliding hole 111 on its opening front end side and which is displaced in the axial direction of the plunger 120; a cam-receiving ring biasing spring 150 for biasing the cam-receiving ring 140 in the protrusive direction of the plunger 120; a pair of wedge-shaped cam chips 160, 160, which slide on a sloped cam guide groove 141 formed on the cam-receiving ring 140 and engage with two racks engraved at the opposite positions where the outer circumference of the plunger 120 is divided into two parts; a cam-guiding ring 170, fitted on the plunger 120 from the outside in a diameter-increased concave portion 11a of the plunger sliding hole 111 at its opening front end for guide controlling disengagement of the pair of wedge-shaped cam chips 160, 160; and a seal plate 180, which retractably fit-inserts the plunger 120 and movably seals the cam-receiving ring biasing spring 150, the cam-receiving ring 140, said the wedge-shaped cam chips 160, 160 and the cam-guiding ring 170 sequentially disposed in a diameter-increased concave portion of the plunger sliding hole 111a on its opening front end side, and when the cam-guiding ring 170 is brought into contact with the back of the seal plate 180 in the diameter-increased concave portion 111a of the plunger sliding hole on its opening front end side, the cam-guiding ring 170 guide-controls the disengagement of the wedge-shaped cam chips 160, 160.

It is noted that in the present example a resin cam guiding ring 170 was adopted. However, a metallic cam guiding ring may be used.

As an arrangement form of the protrusion biasing spring 130, an arrangement form in which the protrusion biasing spring 130 was interposed between a rear end portion of the plunger 120 and a bottom portion of the plunger sliding hole 111, was adopted. However, if the plunger can be biased in its protrusive direction, the protrusion biasing spring 130 may be interposed between a front end portion of the plunger 120 and the seal plate 180. Further, the protrusion biasing spring 130 is a spring for biasing the plunger 120 in a protrusive direction of the plunger 120 with the housing body 110 in accordance with traveling chain tension. Therefore, the protrusion biasing spring 130 can of course exert larger biasing force sufficiently than the cam-receiving biasing spring 150 for biasing the cam-receiving ring 140 in the protrusive direction of the plunger 120.

In the chain tension-imparting device 100 of the present example, an angle (theta) of slope of the sloped cam guide groove 141 formed on the cam-receiving ring 140 was set at 45° so that the wedge-shaped cam chips 160 can ascend on the sloped cam guide groove 141 or descend thereon in accordance with the extendable or retractable operation of the plunger 120 to slide smoothly, as shown in FIG. 4. However, when the angle (theta) of slope of the sloped cam guide groove 141 is applied to backrush distances required for individual engines it may be freely set at an range of 15°<theta<70°.

The rear end portion of the housing body 110 is provided with a hydraulic valve mechanism 190 for causing oil pressure to act on a rear end portion of the plunger 120 from an external oil supply source not shown to accurately adjust the protrusion biasing force of the plunger 120. This hydraulic valve mechanism 190 comprises a ball seat 191 press-fitted into a retainer 193, which will be described later, a check ball 192, which freely abuts on this ball seat 191, and a retainer 193, which holds this check ball 192. In the hydraulic valve mechanism 190 the flow of oil into a high pressure oil chamber 195 formed between the plunger sliding hole 111 and the rear end portion of the plunger 120 is allowed and on the contrary the back flow of oil from the high pressure oil chamber 195 is blocked, so that the impartment and maintenance of chain tension through the plunger 120 can be attained accurately.

Further, in the arrangement of the housing body 110, the plunger 120, the cam-receiving ring 140, the cam-receiving ring biasing spring 150, the wedge-shaped cam chips 160, and the cam guiding ring 170, when a minimum backrush distance of the plunger is defined as X, a maximum backrush distance thereof is defined as Y, a maximum displacement width of the cam-receiving ring is defined as S and a pitch of the rack 121 is defined as P, an arrangement form of the plunger, the housing body, the cam-receiving ring biasing spring, the cam-receiving ring, the wedge-shaped cam chips and the cam-guiding ring is defined so as to satisfy X=S and Y=P+S, a maximum backrush distance Y and a minimum backrush distance X, which affect on noises at the start of engine, can be adjusted by a maximum displacement width S of the cam-receiving ring 140. That is if one of a ring thickness R of the cam guiding ring 140, a depth W of the opening front end side diameter-increased concave portion 111a, and a lower portion length V of the cam-receiving ring 140 is changed, the above-mentioned arrangement of the housing body 110, the plunger 120 and the like can be easily adjusted. Further, the maximum backrush distance Y can be also adjusted by changing the engagement pitch P of the rack 121, whereby an application range of the chain tension-imparting device of the present invention to engines having various properties is increased.

Therefore, in the application of the chain tension-imparting device 100 of the present example to various engines, if the depth W of the opening front end side diameter-increased concave portion 111a is changed to adjust the backrush distance, the unification of the cam-receiving ring 140, the cam guiding ring 170 and the like can be made. Alternatively, if the ring thickness R of the cam guiding ring 170 is changed to adjust the backrush distance, the unification of the housing body 110, the cam-receiving ring 140 and the like can be made. In all cases, the backrush distance required of engines having various properties can be set freely and in a wide range without depending on only an angle of slope of the sloped cam guide groove 141 as in the conventional case.

It should be noted that the term "maximum backrush distance Y" in the present example means a return distance from a position Ly just before the wedge-shaped cam chips 160 each step over one tooth of the rack 121 to a position Lb in a backstop state, and the term "minimum backrush distance X" means a return distance from a position just before the wedge-shaped cam chips 160 each step over one tooth of the rack 121, that is a position Ly from moment when the wedge-shaped cam chips each stepped over one tooth of the rack to a position of Lx in a backstop state.

In the thus obtained chain tension-imparting device 100 of the present example, when the timing chain TC is loosened from a state where a backstop function of the plunger 120 was operated as shown in FIG. 5, the plunger 120 biased in a protrusive direction by the protrusion biasing spring 130 is moved forward immediately as shown in FIG. 6.

It is noted that the drawing line Lb in FIG. 5 shows a front end position of the plunger 120 in the backstop state.

That is when the plunger 120 is moved toward a traveling timing chain TC from the backstop state, the cam-receiving ring 140 in the opening front end side diameter-increased concave portion 111a is displaced in the protrusive direction of the plunger 120 by biasing force of the cam-receiving ring biasing spring 150 as shown in FIG. 6, and the pair of wedge-shaped cam chips 160,160 and the cam guiding ring 170 are displaced toward the back surface of the seal plate 180 in the opening front end side diameter-increased concave portion 111a in the protrusive direction of the plunger 120 with the above-mentioned displacement of the cam-receiving ring 140.

In this case, the drawing line Lb in FIG. 6 shows a front end position of the plunger 120 in the backstop state, the drawing line Ls shows a front end position of the plunger 120 in a state where the cam-receiving ring 140 was displaced by a maximum displacement width S in the protrusive direction, and the drawing Ly shows a front end position of the plunger 120 just before the pair of wedge-shaped cam chips 160, 160 steps over the racks 121, 121 of the plunger 120 by one tooth.

Then, when the cam guiding ring 170 abuts on the back surface of the seal plate 180 in the opening front end side diameter-increased concave portion 111a and stops there, the pair of wedge-shaped cam chips 160,160 are slid on the two sloped cam guiding groove 141, 141 to ascend toward the outer circumferential sides of the ring until the engagement of the wedge-shaped cam chips 160,160 with the racks 121, 121 of the plunger 120 is released while pushing the cam-receiving ring 140 back in the opposite direction to the protrusive direction of the plunger 120, as shown in FIG. 7.

In this case, the drawing line Lb in FIG. 7 shows a front end position of the plunger 120 in the backstop state, the drawing Ly shows a front end position of the plunger 120 just before the pair of wedge-shaped cam chips 160, 160 steps over the racks 121, 121 of the plunger 120 by one tooth, and the drawing line Lx shows a front end position of the plunger 120 in a state where the plunger 120 was moved forward by one tooth of each of the racks 121, 121 thereby to operate a backstop function.

Since the cam-guiding ring 170 is in contact with the back of the seal plate 180 in the opening front end side diameter-increased concave portion 111a to stop there, at the moment when the engagement between the pair of wedge-shaped cam chips 160, 160 and the racks 121, 121 of the plunger is released, the wedge-shaped cam chips 160, 160 are, as shown in FIG. 8, slid on the sloped cam-guiding grooves 141, 141 in the cam-receiving ring 140 in the opposite direction to descend toward the central axis of the plunger 120 until they engage with the racks 121, 121 of the plunger 120 at positions shifted by one tooth in each of the rack. As a result by its reaction the cam-receiving ring 140 is relatively displaced again in the protrusive direction of the plunger 120.

In this case, the drawing line Ly in FIG. 8 shows a front end position of the plunger 120 at the moment when the pair of wedge-shaped cam chips 160, 160 have stepped over one tooth of each of the racks 121, 121 of the plunger 120, and the drawing line Lx shows a front end position of the plunger 120 in a state where the plunger 120, which was moved forward by one tooth of the rack 121, was displaced by a maximum displacement width S for the cam-receiving ring 140 from the position of the drawing line Ly in the opposite direction to the protrusive direction of the plunger 120 thereby to operate the backstop function.

When external force to push the plunger 120 back is applied to the chain tension-imparting device 100 of the present example from the chain side in such a state, the wedge-shaped cam chips 160, 160, which stepped over the racks 121 of the plunger 120 by one tooth, can exert a wedge action on the plunger 120 as in a case before stepping over the rack of the plunger 120 by only one tooth. Thus, the wedge-shaped cam chips can exert a backstop function to block the retractive displacement of the plunger 120.

In this case, the drawing line Lx in FIG. 9 shows a front end position of the plunger 120 in a state where the plunger 120, which was moved forward by one tooth of the rack 121, was displaced by a maximum displacement width S for the cam-receiving ring 140 from the position of the drawing line Ly in the opposite direction to the protrusive direction of the plunger 120 thereby to operate the backstop function.

The present example includes a pair of wedge-shaped cam chips 160, 160, which engage with two racks 121, 121 engraved at the opposed positions where the outer circumference of the plunger 120 is divided into at least two parts. Then, when the backstop function to block the retractive displacement of the plunger 120 is acted, force which is pushed back through the plunger 120, is uniformly imparted to the pair of the wedge-shaped cam chips 160, 160 each disposed at the opposed positions, which divide the outer circumference of the plunger 120 into two parts.

Then, the force F applied from the plunger 120 is dispersedly imparted to the cam-receiving ring 140 as shown by f1 and f1 at the opposed positions where the outer circumference of the plunger 120 is divided into two parts in FIG. 9 thereby to be reduced.

As described above, the chain tension-imparting device 100 of the present example exerts an appropriate backstop function and can prevent wobbling noise of a chain and whistling sounds due to excess tensioning of the chain generated by excess protrusion of a plunger 120 to maintain proper chain tension. Further, a maximum backrush distance Y and a minimum backrush distance X, which affect on noises at the start of engine, can be adjusted by a maximum displacement width S of the cam-receiving ring 140. That is if one of a ring thickness R of the cam guiding ring 140, a depth W of the opening front end side diameter-increased concave portion 111a, and a lower portion length V of the cam-receiving ring 140 is changed, the above-mentioned arrangement of the housing body 110, the plunger 120 and the like can be easily adjusted. Further, the maximum backrush distance Y can be also adjusted by changing the engagement pitch P of the rack 121, whereby an application range of the chain tension-imparting device of the present invention to engines having various properties is increased. Accordingly the effects of the present example are very large.

Effects of the Invention

The chain tension-imparting device of the present invention includes a plurality of wedge-shaped cam chips, which slide on the sloped cam guiding groove provided in the plunger sliding hole of the housing body and engage with a plurality of racks engraved on the outer circumference. Therefore, when a chain is elongated during engine operation, an appropriate backstop distance (backrush distance) is controlled by sequential proceeding of the plunger by one tooth so that foreign sounds are prevented and whistling sounds, which are generated during excess tensioning of the chain, are prevented. As a result proper chain tension can be maintained. In addition to these effects the following peculiar effects can be obtained in the present invention.

Figure 10:
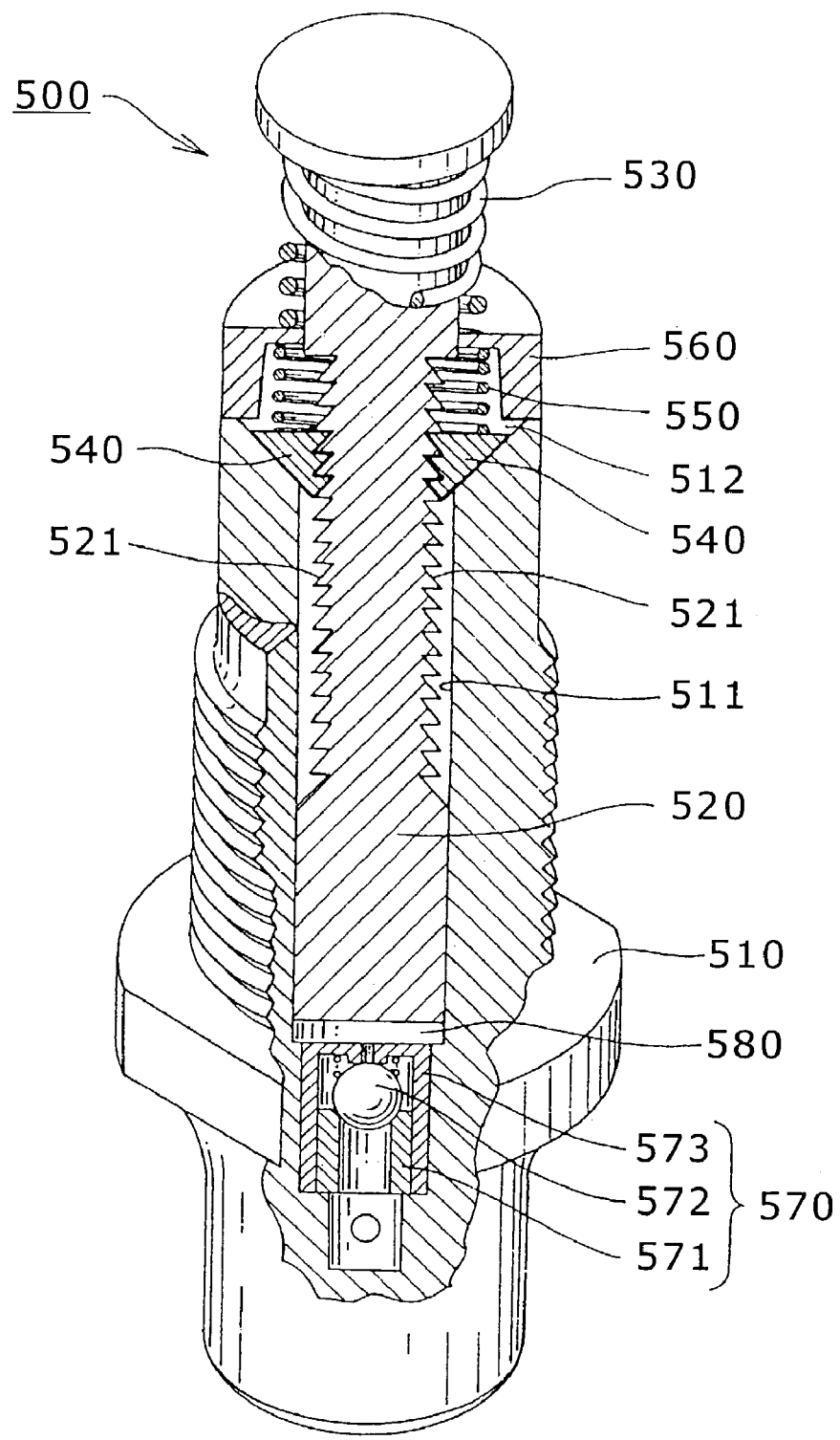
FIG. 10 is a prior art drawing illustrating a chain tension-imparting device.

The chain tension-imparting device in the present invention comprises a cam-receiving ring, fitted on the plunger from the outside in a diameter-increased concave portion of the plunger sliding hole on its opening front end side and which is displaced in the axial direction of the plunger; a cam-receiving ring biasing spring for biasing the cam-receiving ring in the protrusive direction of the plunger; a plurality of wedge-shaped cam chips, which slide on a sloped cam guide groove formed on the cam-receiving ring and engage with a plurality of racks engraved on the outer circumference of the plunger respectively; and a cam-guiding ring, fitted on the plunger from the outside in a diameter-increased concave portion of the plunger sliding hole at its opening front end for guide controlling disengagement of the plurality of wedge-shaped cam chips; and when the cam-guiding ring is brought into contact with the back of the seal plate in the diameter-increased concave portion of the plunger sliding hole on its opening front end side, the cam-guiding ring guide-controls the disengagement of the wedge-shaped cam chips. Accordingly, the plurality of wedge-shaped cam chips can be positioned by the cam guiding ring of a rigid body. Thus, in the chain tension-imparting device of the present invention, unbalanced motion of the respective wedge-shaped cam chips is further reduced as compared with a case where the conventional cam biasing spring was used as shown in FIG. 10, a phenomenon in which only one of the wedge-shaped cam chips engages with the rack of the plunger can be avoided and the durability of the cam is improved.

Particularly, for resin cam guiding rings, coefficients of friction between the cam guiding ring and the wedge-shaped cam chip can be further decreased as compared with iron based metallic or aluminum cam guiding rings, whereby the behavior of the wedge-shaped cam chip becomes smooth and follow-up properties are improved. Further, since the chain tension-imparting device of the present invention has a structure in which a cam guiding ring can be adopted in place of a conventional cam biasing spring shown in FIG. 10, a tensioner structure on the front end side with respect to the wedge-shaped cam chips can be simplified and a length of the rack-engraved can be shortened. Therefore, the length of the tensioner can be shortened and excellent durability can be exerted.

According to the chain tension-imparting device of the present invention, since an arrangement form of the plunger, the housing body, the cam-receiving ring biasing spring, the cam-receiving ring, the wedge-shaped cam chips and the cam guiding ring is formed so that X=S and Y=P+S are satisfied, backrush distances required of individual engines can be set freely and in a wide range. Thus, wear in a tooth head and chipping of tooth, which is generated depending on a tooth length in the rack of the plunger when the backrush distance was adjusted, can be avoided. And at the same time, the chain tension-imparting device of the present example exerts an appropriate backstop function and can prevent wobbling noise of a chain and whistling sounds due to excess tensioning of the chain generated by excess protrusion of a plunger to maintain proper chain tension. Further, a maximum backrush distance y and a minimum backrush distance X, which affect on noises at the start of engine, can be adjusted by a maximum displacement width S of the cam-receiving ring. That is if one of a ring thickness of the cam guiding ring, a depth of the opening front end side diameter-increased concave portion, and a lower portion length of the cam-receiving ring is changed, the above-mentioned arrangement of the housing body, the plunger and the like can be easily adjusted. Further, the maximum backrush distance Y can be also adjusted by changing the engagement pitch P of the rack, whereby an application range of the chain tension-imparting device of the present invention to engines having various properties is increased.

DESCRIPTION OF REFERENCE NUMERALS 100, 500 . . . Chain tension-imparting device
110, 510 . . . Housing body
111, 511 . . . Plunger sliding hole
111a . . . Opening front end side diameter-increased concave portion
120, 520 . . . Plunger
121, 521 . . . Rack
130, 530 . . . Protrusion biasing spring
140 . . . Cam-receiving ring
141, 512 . . . Sloped cam guiding groove
150 . . . Cam-receiving ring biasing spring
160, 540 . . . Wedge-shaped cam chip
170 . . . Cam guiding ring
180 . . . Seal plate
190 . . . Hydraulic valve mechanism
191 . . . Ball seat
192 . . . Check ball
193 . . . Retainer
195 . . . High pressure oil chamber
S1: Driving shaft side sprocket
S2: Driven shaft side sprocket
TC: Timing chain
TG: Tensioner guide
TL: Tensioner lever
E: Engine block wall The invention described hereinabove has been set forth by way of example only, and those skilled in the art will understand that many modifications and changes may be made to the invention without departing from the spirit and scope of the CLAIMS which follow hereinbelow.

We claim:

1. A chain tension-imparting device comprising: a plunger, which retractably protrudes toward a traveling chain; a housing body which includes a plunger sliding hole into which said plunger is retractably fit-inserted; a protrusion biasing spring, which biases said plunger in a protrusive direction with respect to said housing body; a cam-receiving ring, fitted on the plunger from the outside in a diameter-increased concave portion of said plunger sliding hole on its opening front end side and which is displaced in the axial direction of the plunger; a cam-receiving ring biasing spring for biasing said cam-receiving ring in the protrusive direction of the plunger; a plurality of wedge-shaped cam chips, which slide on a sloped cam guide groove formed on said cam-receiving ring and engage with a plurality of racks engraved on the outer circumference of said plunger respectively; a cam-guiding ring, fitted on the plunger from the outside in a diameter-increased concave portion of said plunger sliding hole at its opening front end for guide controlling disengagement of the plurality of wedge-shaped cam chips; and a seal plate, which retractably fit-inserts said plunger and movably seals said cam-receiving ring biasing spring, said cam-receiving ring, said wedge-shaped cam chips and said cam-guiding ring sequentially disposed in a diameter-increased concave portion of said plunger sliding hole on its opening front end side, wherein when said cam-guiding ring is brought into contact with the back of said seal plate in the diameter-increased concave portion of said plunger sliding hole on its opening front end side, said cam-guiding ring guide-controls the disengagement of said wedge-shaped cam chips.

2. A chain tension-imparting device according to claim 1, characterized in that when a minimum backrush distance of said plunger is defined as X, a maximum backrush distance thereof is defined as Y, a maximum displacement width of said cam-receiving ring is defined as 0 and a pitch of said rack is defined as P, an arrangement form of said plunger, said housing body, said cam-receiving ring biasing spring, said cam-receiving ring, said wedge-shaped cam chips and said cam-guiding ring is defined so as to satisfy X=S and Y=P+S.

* * * * *

UNITED STATES PATENT AND TRADEMARK OFFICE
CERTIFICATE OF CORRECTION

PATENT NO. : 7,037,228 B2 Page 1 of 1
APPLICATION NO. : 10/454860
DATED : May 2, 2006
INVENTOR(S) : Yoshida et al.

It is certified that error appears in the above-identified patent and that said Letters Patent is hereby corrected as shown below:

Col. 1, line 33, after "of" delete -said-

Col. 6, line 54, after "portion" delete -11a- and insert --111a--

Col. 12, line 50, after "as" delete -0- and insert --S--.

Signed and Sealed this

Twenty-fifth Day of July, 2006

JON W. DUDAS
*Director of the United States Patent and Trademark Office*